Dec. 9, 1958 H. LINTVEDT 2,863,987
SPUD AND LIKE FITTING WELDING APPARATUS AND METHOD
Filed June 7, 1956 4 Sheets-Sheet 1

INVENTOR
HALVARD LINTVEDT

BY Strauch, Nolan & Neale

ATTORNEYS

Dec. 9, 1958 H. LINTVEDT 2,863,987
SPUD AND LIKE FITTING WELDING APPARATUS AND METHOD
Filed June 7, 1956 4 Sheets-Sheet 2

INVENTOR
HALVARD LINTVEDT
BY
Strauch, Nolan & Neale
ATTORNEYS

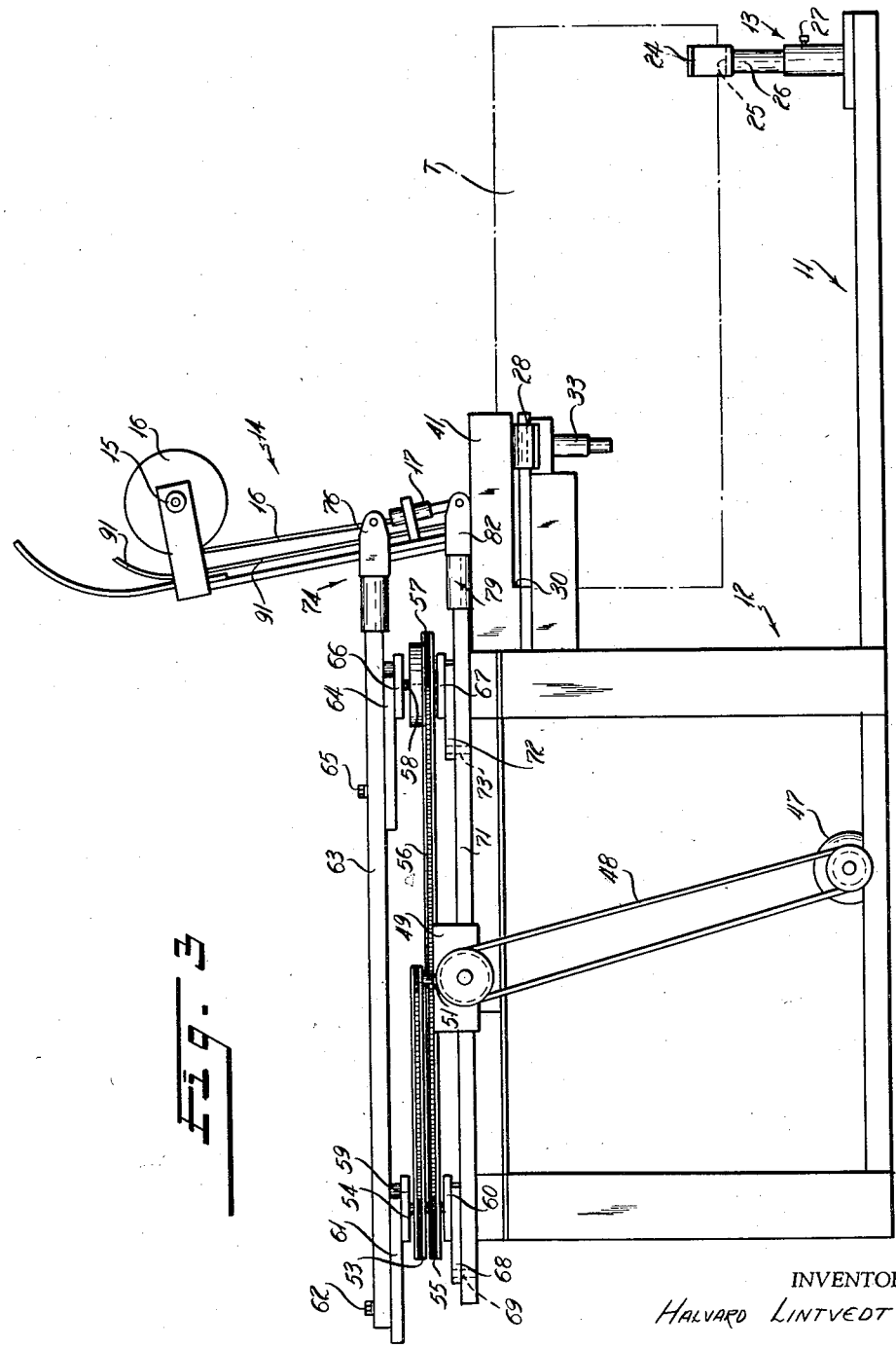

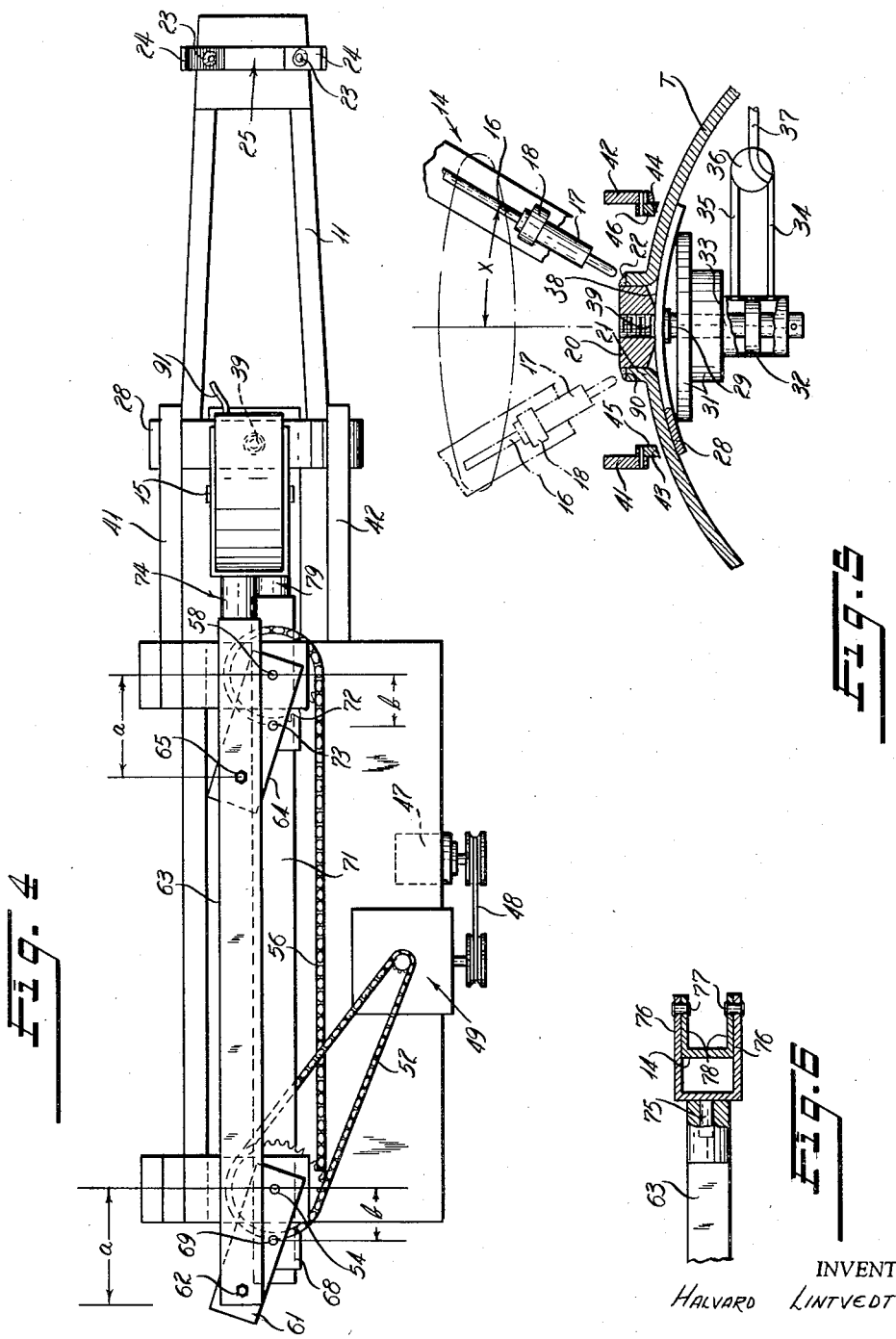

United States Patent Office 2,863,987
Patented Dec. 9, 1958

2,863,987

SPUD AND LIKE FITTING WELDING APPARATUS AND METHOD

Halvard Lintvedt, Kalamazoo, Mich., assignor to Ruud Manufacturing Company, Kalamazoo, Mich., a corporation of Delaware Application June 7, 1956, Serial No. 589,979

13 Claims. (Cl. 219—124)

This invention relates to the manufacture of sheet metal tanks such as hot water storage tanks and is particularly concerned with an apparatus and method for efficiently welding conduit attachment fittings to such tanks.

In the manufacture of hot water storage and like tanks, it is the practice to form the usually cylindrical sidewall of the tank from a sheet of metal with a longitudinal welded seam and then insert headers at both ends to complete the tank. The hot and cold water conduits enter the tank sidewall, and since the sheet metal of the sidewall is thin, it is customary to weld sufficiently thick internally threaded spuds in openings in the sidewall for attachment of the conduits. The welding of these spuds to the sheet metal tank sidewall has been a time-consuming, expensive part of the operation, and difficulties have been encountered due to non-uniformity of welds.

The invention provides an apparatus and method for speedy welding of the spuds in place wherein a continuously energized welding gun is moved constantly and recurrently in a predetermined path and no time of the operator is required to control motion or energization of the welding gun when welding, and wherein the tank is moved to accurately present the spud at the welding zone. No time is lost moving the gun or turning the weld current on or off.

It is the major object of the invention to provide a novel tank spud welding apparatus and method wherein the tip of the welding gun or electrode holder is constantly moved in the same continuous predetermined path and the spud and tank wall area to be welded is moved into that path during the welding operation.

A further object of the invention is to provide an electrode head assembly in a spud welding apparatus having novel mechanism for continuously moving the head assembly in a predetermined path.

It is a further object of the invention to provide a novel welding apparatus wherein the welding electrode head assembly is constantly moved in a conical path wherein it always faces the same direction and does not twist the electric cable or the electrode wire leading to the gun.

It is a further object of the invention to provide a tank spud welding apparatus having a novel arrangement for positioning and clamping each tank and spud area to be welded in exactly the same position relative to a continuously moving welding tip.

A further object of the invention is to provide a novel anvil arrangement in a spud welding apparatus for bringing successive pieces of work to be welded up to the same distance from a continuously moving energized welding tip.

Further objects of the invention will appear as the description proceeds in connection with the appended claims and the annexed drawings wherein:

Figure 3 is a side elevation of the apparatus of Figures 1 and 2;

Figure 4 is a top plan view of the apparatus of Figure 3;

Figure 5 is an enlarged section showing the anvil structure, the path of the welding head and the welded tank joint accomplished by the invention; and Figure 6 is a section on line 6—6 of Figure 2 showing the connecting rod to welding head coupling.

Figure 1:
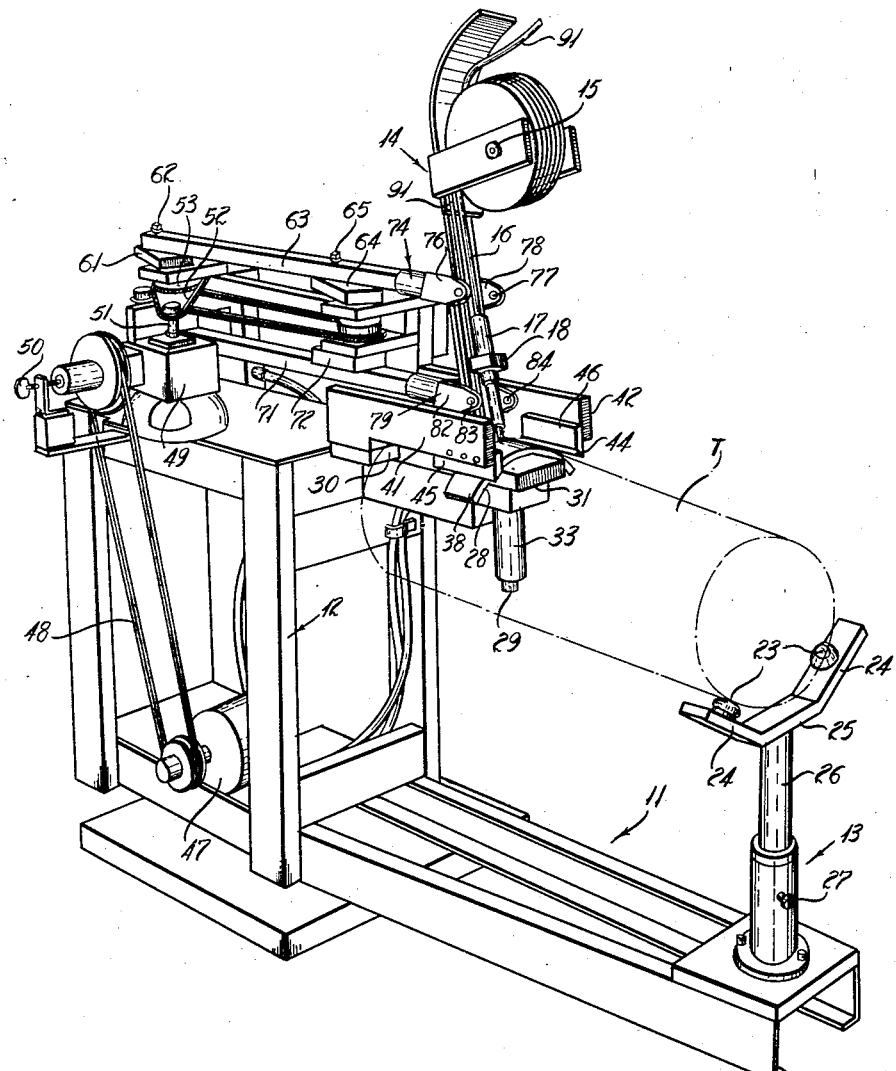
Figure 1 is a generally perspective front view illustrating the welding apparatus according to a preferred embodiment of the invention.
Figure 2:
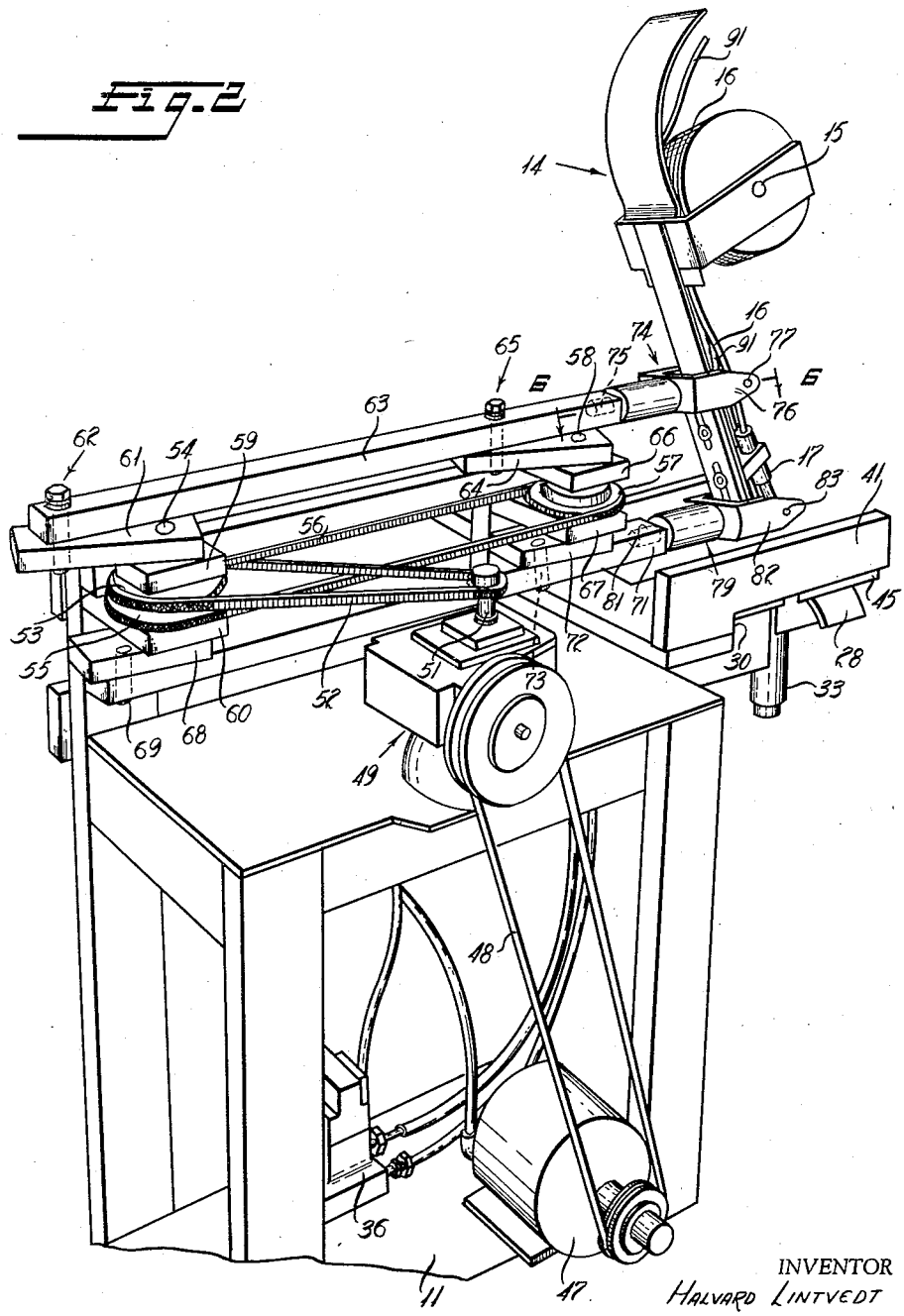
Figure 2 is a generally perspective side view of the apparatus of Figure 1.

The apparatus of the preferred form of the invention comprises a support structure having a base 11 with an upright rigid frame 12 at one end and an upright standard 13 at the other end. A welding electrode head assembly 14 is mounted on frame 12 so as to be moved in a predetermined conical path by mechanism to be herein described. This assembly comprises an arbor 15 on which is mounted a supply coil of fusible welding wire 16 which extends down through an electrode holding nozzle or gun 17 fixed in a bracket 18 rigid with the holder. The entire electrode head assembly 14 is disposed at a selected angle X (Figure 5) with respect to the vertical and so as to locate the tip end of wire 16 at the welding zone as will appear. Any suitable means for automatically feeding the wire 16 longitudinally as it is consumed in operation may be provided on gun 17 or at the arbor.

As shown in Figure 1, the cylindrical tank T has the spuds welded in before the end headers are applied, and its front open end is mounted on the frame 12 and its rear end supported on standard 13. Referring to Figure 5, the internally threaded spud 20 is first frictionally tightly inserted within a short external cylindrical boss 21 formed in the tube sidewall, usually with the spud projecting outwardly a small distance, about one-sixteenth of an inch, beyond the circular flat outer edge 22 of the boss.

At its rear end the tank rests on rounded symmetrically disposed support buttons 23 on the opposite angular arms 24 of a cradle 25 fixed on the upper end of post 26 of standard 13. Arms 24 are disposed at the same angle and buttons 23 are located at the same distance with respect to the vertical longitudinal axis of the apparatus passing through standard 13 so that by merely resting on buttons 23 the tank is centered in the apparatus. Post 26 may be adjusted to suitable height as by set screw 27.

The forward open end of tank T slides over and rests upon a curved anvil 28 fixed upon the upper end of a vertical piston rod 29 that extends slidably through the fixed frame top 31 to the piston 32 of a fluid pressure responsive motor 33 having its casing fixed to the frame. When pushed over the anvil the front end of the tank abuts frame surface 30 which stops it in position with the spud properly longitudinally located below the welding tip as will appear. The motor has conduits 34 and 35 connected to chambers at opposite sides of the piston and leading to a selector valve 36 that may be operated to selectively connect either side of the piston to a conduit 37 leading to a suitable source of air pressure. Thus, under control of valve 36 the anvil 28 may be raised or lowered vertically.

The curvature of the top surface 38 of anvil 28 is preferably about the same as that of the inner wall of the tank, and preferably the piston rod 29 extends a short distance above surface 38 to provide a pilot projection 39 that centers within the spud 20 and helps to prelocate the tank in position before the anvil is raised. Also this projection may push the spud out to proper position should it be too far inside boss 22 when the tank is clamped for welding.

A pair of parallel identical upper anvil bars 41 and 42 project rigidly forwardly from frame 12 in spaced relation above the lower anvil surface 38, and these bars are provided with arcuate surfaces 43 and 44 respectively that preferably lie equidistantly on opposite sides of the longitudinal axis and in an arcuate envelope parallel to the outer surface of the tank wall. It will be noted from Figure 1 that these surfaces are of sufficient length that when anvil 28 is raised by air pressure, the raised forward end of the tank will be tightly clamped in full and large area engagement between the top surface 38 of the lower anvil and the similar surfaces 43, 44 of the upper anvil so as to be automatically accurately aligned with its longitudinal axis horizontal which means that the boss edges 22 are also horizontal.

Surfaces 43 and 44 are provided on removable shoes 45 and 46 respectively that may be replaced when worn or when different upper anvil surfaces are required.

An electric motor 47 on base 11 has a belt and pulley drive 48 to an adjustable speed gear reduction box 49 having a speed control adjustment 50 and a vertical output shaft 51 which through a chain 52 drives sprocket 53 on a vertical shaft 54. Another sprocket 55 rigid with shaft 54 is connected by chain 56 with a sprocket 57 of the same size on vertical shaft 58.

Shaft 54 is supported and journaled in suitable bearings (not shown) in rigid frame members 59 and 60. Above member 59 a crank arm 61 is fixed at one end to shaft 54, and a pivot post assembly 62 pivotally connects the other end of crank arm 61 to an upper connecting rod 63. Similarly, a crank arm 64 has one end fixed to the upper end of shaft 58 and its other end pivotally connected by pivot post assembly 65 to connecting rod 63. Shaft 58 is supported and journaled in suitable bearings (not shown) in rigid frame members 66 and 67. Below member 60 a crank arm 68 is fixed at one end upon shaft 54 and pivoted at its other end by pivot post assembly 69 to a lower connecting rod 71. Similarly, a crank arm 72 is fixed at one end to the lower end of shaft 58 and pivotally connected at 73 to connecting rod 71.

Crank arms 61 and 64 are parallel, extend in the same direction and are of the same effective length $a$ as shown in Figure 4, and crank arms 68 and 72 are parallel, extend in the same direction and are of the same effective length $b$ which is shorter than $a$. Connecting rods 63 and 71 are parallel and horizontal.

The forward end of upper connecting rod 63 carries a swivel jaw assembly 74 that is journaled at 75 on the horizontal axis of rod 63 and has bifurcated arms 76 pivoted at 77 to similar lugs 78 on head 14. Similarly, the forward end of lower connecting rod 71 carries a swivel jaw assembly 79 that is journaled at 81 on the horizontal axis of rod 71 and has bifurcated arms 82 pivoted at 83 to similar lugs 84 on head 14. The pivot axes 77 and 83 are parallel and at right angles to the axes at 75 and 81.

Thus, when motor 47 is energized, the shafts 54 and 58 are continuously driven at the same speed and the pivot axes 62, 69 are moved in different diameter circular paths about the axis of shaft 54 and pivot axes 65, 73 are similarly moved in different diameter circular paths about the axis of shaft 58. This results in the entire electrode head assembly 14 which is inclined at a predetermined angle X to the vertical centerline through the spud 20 in the assembly moving in a conical envelope path during which it always maintains the same inclination with respect to the circular joint to be welded, the journals at 75, 81 and the pivots at 77, 83 permitting this action.

With closer reference to Figure 5, it will be noted that at the start of the welding operation, the welding head 14 and the tip of wire 16 are disposed at the angle X with respect to the vertical axis. The first act of the operator is to start the motor 47 and turn on the welding current circuit. Thereafter, no matter how many welds he makes, it is no longer necessary for him to control the welding head, and all of his efforts are directed to bringing the work to the moving head. Then tank T is mounted as shown and solenoid valve 36 activated to the Figure 5 position so that the anvil 28 is raised by air pressure to raise the front end of the tank up to welding position at the proper distance from the end of wire 16 where it may become part of the welding current circuit and is tightly clamped under high pressure between the anvil surfaces during welding. The lower tip of welding wire 16 travels continuously in the same circular path around the outer periphery of spud 20 and a bead of weld metal 90 is deposited thereabout on shoulder 22.

It will be observed that the welding head always faces in the same direction as it describes its circular conical path whereby there is no twisting of the electric power cable 91 leading down to the gun at 17 and no twisting of the electrode wire 16. This is a novel feature not attainable in known devices and it leads to long life and ease and efficiency of operation.

Once the weld bead 90 is made, the operator merely operates valve 36 to the position where it supplies air pressure through conduit 35 to lower anvil 28 and release the tank which is now free to be removed from the assembly or its ends reversed to weld on a spud at the other end. If desired a spring return may be provided for the anvil rather than air pressure.

A suitable welding wire feed motor of conventional type is provided and the circuit is so connected that this motor is stopped automatically whenever valve 36 is operated to lower the anvil and automatically started when valve 36 is operated to raise the anvil.

My foregoing described welding apparatus permits tank spuds to be welded in place by unskilled workmen at a pace that saves about fifty percent of the time hitherto required to weld such spuds to the tank walls. This results in greatly reduced costs of manufacture, and at the same time, since the welding operation is independent of human skill and the work is always moved to exactly the proper distance from the welding gun, I attain a uniformity of good welding hitherto not attainable. Since the welding tip is always moving in the same circle, there is no need for the operator to consider any starting or stopping position and his role devolves to merely handling the tanks as fast as he can place them in the apparatus.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for welding a conduit attachment spud within an aperture in the sheet metal sidewall of a tank and wherein the spud is preliminarily mounted in said aperture comprising a support for said tank, a welding electrode holder on said support, means for continuously moving said electrode holder so that the welding tip thereof continuously and repeatedly moves in a closed path corresponding to the desired weld region, means in said support for receiving an end of the tank, clamping it under pressure and advancing it toward said electrode holder until the spud is operatively within said path for welding it to the tank sidewall, and means for releasing the tank and moving it away from said path after welding.

2. In the apparatus defined in claim 1, said path lying in a plane parallel to the longitudinal axis of the tank.

3. In the apparatus defined in claim 1, said tank receiving and clamping means comprising relatively movable anvil means engaging opposite sides of the sidewall of said tank and one of said anvil means defining a limit stop to locate said spud weld at a predetermined distance from said welding tip end in said path in operation.

4. Apparatus for welding a spud in an aperture in the sheet metal wall of a tank comprising a welding electrode holder and means for constantly moving said holder so that the welding tip moves repeatedly in a continuous closed path, a movable anvil for underlying the tank sidewall, an associated stationary anvil for overlying the tank side wall and power means for raising said movable anvil until the tank sidewall is thereby clamped against said stationary anvil and the spud is accurately operatively disposed within said path so as to be welded to said tank sidewall.

5. In the apparatus defined in claim 4, a support for said tank comprising said anvils at one end and a cradle for centering and supporting the other end of the tank.

6. In the apparatus defined in claim 4, pilot means on the movable anvil coacting with the spud of the tank mounted thereon.

7. In the apparatus defined in claim 4, at least one of said anvils being shaped to conform to the contour of the tank sidewall.

8. In a welding apparatus, a support, a welding electrode head comprising means for mounting a coil of fusible welding wire, a nozzle for receiving the end of said wire and projecting it as a welding tip, an electric power cable leading to said head, means for continuously moving said entire head upon said support repeatedly in a predetermined path while maintaining said head facing in a given direction so that said cable and welding wire are not twisted during operation, and means on said support for raising work to be welded into the path of said welding tip and lowering it therefrom after welding.

9. In a welding apparatus, a support, a welding electrode head assembly, means for automatically continuously moving said head assembly in a conical envelope with the welding tip thereof moving repeatedly in a circular path corresponding to a desired weld region, and means on said support for moving work to be welded operatively into and out of said path during said continuous movement of the welding head assembly.

10. In a welding apparatus, a support, a welding electrode head assembly, means for continuously moving said head assembly in a conical envelope with the welding tip thereof moving repeatedly in a circular path corresponding to a desired weld region, and means for moving work to be welded operatively into and out of said path, said electrode head assembly being inclined with respect to the axis of said conical envelope, parallel upper and lower reciprocable connecting rods connected to said head assembly, and a crank means of different size for simultaneously reciprocating said connecting rods to move said head in said conical envelope.

11. In the welding apparatus defined in claim 9, said last means comprising means on said support for receiving the open end of a tank having an inserted spud to be welded thereto, clamping the tank under pressure and accurately moving said tank and spud operatively into said circular path.

12. Apparatus for welding a spud in an aperture in the sidewall of an open ended tank comprising a support, an electrode head assembly on the support and means for continuously moving it so that the welding tip continuously and repeatedly moves in a closed path corresponding to the weld region between the tank and spud, anvil means on the support for receiving the end of the tank thrust therebetween, means on the support for limiting endwise movement of the tank for locating the spud adjacent said path, and power means for selectively actuating said anvil means to clamp the tank and move the spud operatively into said path.

13. In the apparatus defined in claim 12, said anvil means comprising a stationary upper anvil that limits the movement of the tank into said path to the optimum welding distance.

References Cited in the file of this patent

UNITED STATES PATENTS

| | | |
|---|---|---|
| 1,638,892 | Stresau | Aug. 16, 1927 |
| 1,642,825 | Pearce | Sept. 20, 1927 |
| 1,667,587 | Chapman | Apr. 24, 1928 |
| 1,949,251 | Gilbert | Feb. 27, 1934 |
| 2,030,689 | Dorrat | Feb. 11, 1936 |
| 2,682,598 | Macoy | June 29, 1954 |